Patented July 5, 1949

2,475,002

UNITED STATES PATENT OFFICE 2,475,002

STABILIZATION OF CURED POLYMERS

Burnard S. Biggs, Summit, N. J., assignor to Bell Telephone Laboratories, Incorporated, New York, N. Y., a corporation of New York No Drawing. Application April 30, 1943, Serial No. 485,161

2 Claims. (Cl. 260—75)

This invention relates to methods of improving the life and heat stability of the infusible, insoluble substances prepared by heating high molecular weight, thermoplastic polyesters with acyl peroxides.

A new class of cured synthetic rubbers has recently been produced by heating non-crystalline, plastic polyesters of high molecular weight with benzoyl peroxide or other acyl peroxides. Tough, rigid, non-fusible, microcrystalline polymers have also been produced by a similar vulcanization of normally highly crystalline, fusible polyesters. These cured polyesters are more particularly described and claimed in the copending applications of C. S. Fuller, Serial No. 401,952, filed July 11, 1941 and now Patent No. 2,388,319, November 6, 1945, Serial No. 401,956, filed July 11, 1941 and now abandoned, and Serial No. 485,202, filed concurrently with the present application and now Patent No. 2,448,585, September 7, 1948.

The amount of benzoyl peroxide, or other acyl peroxide, required for curing varies from about .5 per cent by weight or less for polyesters containing a substantial proportion of olefinic bonds and no inactivating substances to about 25 per cent for fully saturated polyesters heavily loaded with channel carbon black. Those polymers cured with large amounts of peroxide, particularly those cured with more than about 5 per cent peroxide, deteriorate much more rapidly in tensile strength and modulus than those cured with smaller amounts, particularly when exposed to moisture and elevated temperatures.

The present invention is based on the discovery that the stability of these cured polyesters can be increased by soaking them in neutral, inert liquids which are solvents for acids having the same acyl radicals as the acyl peroxides used for curing and which do not adversely affect the polymer. Almost any organic solvent for the appropriate acid is suitable. Neutral inorganic solvents having the requisite properties stated above are also suitable. Ethyl alcohol, methyl alcohol, ethyl ether, acetone, chloroform, benzene, carbon tetrachloride and carbon disulphide may be mentioned as examples of solvents suitable for treating polymers cured with benzoyl peroxide. Water is also suitable although less effective. The soaking operation will ordinarily be carried out at room temperature although higher or lower temperatures may be employed where the polymer is not unduly affected.

The time required for effective soaking will depend upon the thickness of the cured article, or upon the ratio of its surface area to its volume. For thin articles four or five hours are ordinarily sufficient to give a substantial increase in stability. Longer or shorter periods may be employed depending upon the result desired. The most noticeable improvement occurs in those polymers cured with the largest amounts of peroxides and particularly those cured with from 5 per cent to 25 per cent or more by weight of peroxide. However, a substantial improvement in stability is also obtained with those polymers cured with smaller amounts.

The stabilizing treatment referred to above is effective for any rubber-like or microcrystalline substance obtained by curing, with an acyl peroxide, a high molecular weight polyester which is either normally a viscous liquid at room temperatures or normally a microcrystalline solid at room temperatures which is capable of being reduced to a viscous liquid upon heating.

These polyesters may be strictly linear polyesters of high molecular weight containing no non-benzenoid carbon-to-carbon unsaturation which are prepared by superesterification of a glycol with a dicarboxylic acid or of a hydroxy acid with itself in a manner similar for instance to that described for crystalline polyesters in U. S. Patents 2,071,250 and 2,249,950. Polyesters which are essentially similar but which contain limited amounts of olefinic unsaturation are also suitable. These partially unsaturated polyesters may be prepared in the same manner as the fully saturated polyesters except that one or more of the ingredients of the reaction mixture from which they are prepared contain a proportion of unsaturated carbon-to-carbon bonds.

The present invention is most concerned with the stabilization of those substances of relatively high tensile strength produced by curing polyesters which have achieved an extremely high degree of linear growth, although obviously substances possessing a considerable lower degree of polymerization will also benefit from this stabilization.

With the strictly linear polyesters prepared from glycols and dicarboxylic acids containing no non-benzenoid unsaturation or from monohydroxy monocarboxylic acids containing no non-benzenoid unsaturation, the degree of linear growth is measured directly by the molecular weight of the polyester since theoretically each molecule is made up of a single long chain. There is a relatively sharp increase in the tensile strength of the cured polyesters when the molecular weights of the polyesters from which they are prepared achieve and exceed molecular weights in the vicinity of 8,000 to 10,000, as estimated by the Staudinger viscosity method. Linear polyesters of such molecular weights ordinarily possess intrinsic viscosities in chloroform of at least .4. Linear polyesters will also possess such molecular weights if they contain an average of at least 500 or 600 atoms in their linear chains or if they contain at least 98 ester groups for each 100 total ester, hydroxyl and carboxyl groups in the polyester (98 per cent of theoretical complete esterification).

Polyesters formed from reactants, at least one of which contains olefinic unsaturation, will possess these high degrees of linear growth associated with high tensile strength if they contain at least 98 ester groups per 100 total ester, hydroxyl and carboxyl groups in the polyester.

In order to produce the high degree of esterification or condensation indicated above, the reactants from which the polyesters are produced must be subjected to a prolonged heating operation under conditions such as to remove the reaction by-products continuously and effectively as described for instance in U. S. Patents 2,071,250 and 2,249,950. The reaction by-products are most effectively removed by bubbling an inert gas, such as dry oxygen-free hydrogen, through the reaction mixture until esterification or condensation has proceeded to the desired degree of completion, with or without the application of reduced pressure.

The process of the present invention is applicable to cured polyesters derived from any glycols and dicarboxylic acids or any monohydroxy monocarboxylic acids which are capable of esterifying to form linear ester chains having lengths of the order desired. Typical saturated glycols and dicarboxylic acids are described in U. S. Patent 2,071,250. Those most commonly used are the polymethylene glycols and dicarboxylic acids and the alkyl substituted glycols and acids. Unsaturation may be introduced by substituting a conjugated unsaturated dicarboxylic acid, such as muconic, maleic, fumaric, itaconic or mesaconic acids, for a portion of the saturated acids, or by substituting a non-conjugated unsaturated dicarboxylic acid, such as dihydromuconic acid, for all or a part of the saturated acid. Similarly, a glycol containing olefinic unsaturation may be substituted for a portion or all of the saturated glycol or a hydroxy acid containing olefinic unsaturation may be substituted for all or part of a saturated hydroxy acid.

As examples of polymers which may be treated according to the present invention may be mentioned those produced by curing polyesters prepared by esterifying sebacic acid or succinic acid with a mixture of an alkyl substituted polymethylene glycol, such as isopropylene glycol, and a polymethylene glycol, such as ethylene glycol. Similar polymers in which maleic acid replaces the succinic or sebacic acids to an extent of about 3 mol per cent, for instance, may also be stabilized in accordance with the present invention. These polymers are rubber-like at room temperatures if the isopropylene glycol constitutes at least 80 mol per cent of the total glycol entering sebacate or sebacate-maleate polyesters or if the isopropylene glycol constitutes at least 50 mol per cent of the total glycol entering the succinate or succinate-maleate polyesters.

In order to produce polyesters of the high degree of linear growth referred to above, it is necessary to limit the amount of conjugated unsaturation present in the reaction mixture so that the resulting theoretical polyester which would be produced, if no cross-linking occurred, would contain less than about five such olefinic bonds per 400 atoms in the linear chain and preferably less than about two such bonds per 400 atoms in the linear chain. In general, when the unsaturated polyesters of the high degree of linear growth referred to above are produced by the esterification of a glycol with a mixture of a saturated dicarboxylic acid, such as sebacic or succinic, and an unsaturated dicarboxylic acid, such as maleic, the unsaturated acid should not exceed 10 mol per cent of the dicarboxylic acid mixture and preferably the saturated acid constitutes at least 95 mol per cent of the dicarboxylic acid mixture. Larger amounts of conjugated unsaturation may obviously be employed when it is not desired to produce polyesters of such a high degree of condensation, which are fluid or fusible.

As stated above, polyesters produced as described are cured by introducing an acyl peroxide in any suitable manner and heating to a temperature sufficiently high to cause a practical rate of curing. Benzoyl peroxide is the most effective curing agent yet found, but other acyl peroxides, such as lauryl peroxide, are suitable although less effective. If the polyester is sufficiently fluid or plastic to be milled on cold rolls or can be reduced to a fluid or plastic state by heating to a temperature sufficiently low that no curing takes place, the peroxide in a finely divided state is milled directly into the polyester. If the polyester can not be reduced to a fluid state below the curing temperature, the peroxide may be dissolved in a solution of the polyester and the solvent may be subsequently evaporated.

The amount of curing agent required to give maximum tensile strength, when the cured product is a rubber-like substance, varies with the composition of polyester, being affected both by the nature of the saturated components and by the amount of unsaturation. When a given polyester is cured with increasing amounts if benzoyl peroxide, the tensile strength rises very sharply, passes through a peak and then decreases slowly. In saturated polyesters this peak is quite broad, the optimum amounts being from 3 per cent to 6 per cent for sebacate polyesters and from 5 per cent to 8 per cent for succinate polyesters. As the amount of unsaturation increases, the peak becomes much sharper and the actual amount of peroxide required for curing becomes much less. Thus for a sebacate polyester in which 4 mol per cent of the sebacic acid is replaced by maleic acid, the optimum amount of peroxide is from .5 per cent to 1 per cent. For a corresponding succinate-maleate, the optimum amount is from 1 per cent to 2 per cent. Corresponding amounts of benzoyl peroxide furnish the optimum cure for the highly crystalline polyesters.

When the cured polyester is a rubber-like substance, the incorporation of a finely divided reinforcing pigment prior to curing is extremely desirable since it increases the tensile strength considerably. It is often desirable to add colloidal pigments to the highly crystalline polyesters as well. Carbon black, the most available of the reinforcing pigments, appears to inactivate the peroxide, making necessary the use of extremely large amounts of peroxide to secure the proper curing. Thus, the incorporation of 60 per cent by weight of "Micronex," a channel black, in an unsaturated polyester, which would ordinarily require about 1 per cent benzoyl peroxide for curing, may increase the amount of peroxide required to about 25 per cent. These large amounts of peroxide produce cured polyesters which are considerably less stable than those cured with small amounts, of the order of several per cent. By the process of the present invention the life of these polymers cured with large amounts of peroxide may be increased substantially.

The following specific example will illustrate the manner in which the present invention may be practiced.

Example 1

A mixture of dicarboxylic acids containing 97 mol per cent succinic acid and 3 mol per cent maleic acid and a 25 mol per cent excess of a mixture containing 50 mol per cent isopropylene glycol and 50 mol per cent ethylene glycol, together with a small amount of zinc chloride as a catalyst, were placed in a closed glass reaction vessel maintained at 200° C. and a slow stream of dry, oxygen-free hydrogen was bubbled continuously through the molten mixture. A packed reflux column maintained at 110° C. was attached to the reaction vessel. After about five hours no more water was evolved, indicating that substantially complete esterification had occurred. The reflux column was then removed and the pressure in the system was reduced to about 6 millimeters of mercury, the temperature being maintained at about 200° C. and the bubbling of hydrogen being continued. Glycol distilled over-rapidly, and after about 15 minutes an increase in the viscosity of the product was apparent. At the end of about 8 hours the product was removed and found to be an exceedingly viscous, transparent liquid. A portion of this viscous liquid was milled on cold rolls together with about 9 per cent of finely divided benzoyl peroxide. Sixty per cent by weight of Gastex carbon black was then added to the gum on the rolls and the milling was continued until the pigment was well dispersed. This mixture was then cured under pressure for 10 minutes in a mold heated to 125° C., in the form of a sheet 50 mils thick. A portion of the cured sheet was soaked in ethyl alcohol at room temperature for five hours. Samples ¼ inch wide and 2 inches long of both the leached and unleached sheets were maintained immersed in separate test tubes in water maintained at 60° C. The samples were tested periodically to determine their rate of deterioration by measuring their elongation under a 500-gram load. After two days the unleached sample had deteriorated to the point where the 2-inch sample stretched to 4 inches under the 500-gram load. The leached sample required five days of immersion to show the same degree of degradation.

Although the invention has been described in terms of its specific embodiments, certain modifications and equivalents will be apparent to those skilled in the art and are intended to be included within the scope of the invention, which is to be limited only by the reasonable scope of the appended claims.

What is claimed is:

1. The method of stabilizing a polymer produced by heating, with benzoyl peroxide to a curing temperature, a polyester prepared by the esterification of a reaction mixture consisting of a mixture of glycols, consisting of about 20 mol per cent of ethylene glycol and about 80 mol per cent of isopropylene glycol, and a mixture of dicarboxylic acids, consisting of about 97 mol per cent of sebacic acid and about 3 mol per cent of maleic acid, the intramolecular chains formed by said esterification being essentially linear, the number of ester groups in said polyester constituting at least 98 per cent of the total number of ester, hydroxyl and carboxyl groups, which method comprises immersing a thin body of said cured polymer in ethyl alcohol maintained at substantially room temperature, for at least four hours.

2. The method of stabilizing an infusible, insoluble polymer produced by curing, with benzoyl peroxide, a dihydroxy aliphatic hydrocarbon-dicarboxy hydrocarbon polyester the molecules of which are essentially linear and in which the number of ester groups constitutes at least .98 per cent of the total number of ester, hydroxyl and carboxyl groups present, said polyester containing less than 5 olefinic bonds per 400 atoms in the linear ester chains, calculated by assuming no cross-linking between molecules at the unsaturated bonds, and containing no other non-benzenoid unsaturation, which method comprises maintaining said cured polymer immersed in ethyl alcohol for a time sufficient to cause an appreciable improvement in the resistance of the polymer to hydrolysis.

BURNARD S. BIGGS.

REFERENCES CITED

The following references are of record in the file of this patent:

UNITED STATES PATENTS

| Number | Name | Date |
| --- | --- | --- |
| 1,890,668 | Bradley | Dec. 13, 1932 |
| 1,903,961 | Dreyfus | Apr. 18, 1933 |
| 2,071,250 | Carothers | Feb. 16, 1937 |
| 2,129,450 | Talbot | Sept. 6, 1938 |
| 2,252,271 | Mathis | Aug. 12, 1941 |
| 2,255,313 | Ellis | Sept. 9, 1941 |
| 2,260,005 | D'Alelio | Oct. 21, 1941 |

FOREIGN PATENTS

| Number | Country | Date |
| --- | --- | --- |
| 500,547 | Great Britain | Feb. 8, 1939 |